United States Patent [19]
Wells

[11] Patent Number: 4,606,828
[45] Date of Patent: Aug. 19, 1986

[54] SCALE FORMATION PREVENTOR AND/OR REMOVER

[76] Inventor: Marvin E. Wells, 1813 Williamsburg, Denton, Tex. 76201

[21] Appl. No.: 705,886

[22] Filed: Feb. 26, 1985

[51] Int. Cl.$^4$ .............................................. C02F 5/00
[52] U.S. Cl. ..................................... 210/696; 138/42; 204/150; 204/197; 204/248; 210/738; 210/198.1; 210/257.1
[58] Field of Search ................. 138/42; 204/148, 150, 204/197, 248; 210/696, 738, 198.1, 257.1

[56] References Cited

U.S. PATENT DOCUMENTS

| | | | |
|---|---|---|---|
| 913,827 | 3/1909 | Korten | 204/150 |
| 2,560,960 | 7/1951 | Klumb | 204/197 |
| 3,208,926 | 9/1965 | Eckfeldt | 204/409 |
| 3,448,034 | 6/1969 | Craft et al. | 210/696 |
| 3,486,999 | 12/1969 | Craft | 204/197 |
| 3,655,547 | 4/1972 | Lyons, Jr. | 204/248 |
| 3,846,226 | 11/1974 | Kallmes | 138/42 |
| 3,919,068 | 11/1975 | Gary | 204/148 |
| 3,974,071 | 8/1976 | Dunn et al. | 210/696 |
| 4,179,222 | 12/1979 | Strom et al. | 138/42 |

Primary Examiner—Peter Hruskoci
Attorney, Agent, or Firm—Thomas L. Cantrell

[57] ABSTRACT

Apparatus and method for removing hardening calcium-containing and similar minerals from water, in which raw water is passed through a passage, having a reduced cross-sectional area, in an elongated core of a suitable alloy. The passage is provided with closely-spaced parallel walls which have been polished to an image reflective smoothness and etched to create a multiplicity of randomly-positioned microscopic channels and a multiplicity of complementary mesas having smooth, flat tops. The reduced cross-sectional area causes a pressure drop in accordance with Bernoulli's Principle, which causes carbon dioxide to come out of solution, the presence of which inhibits precipitation of calcium carbonate and forms carbonic acid to attack existing scale. The small size and shape of the mesas allow calcite crystals to begin to grow but permit them to break off after a certain size has been attained. The freed calcite crystals then provide nuclei for crystals to grow from the supersaturated solution.

14 Claims, 7 Drawing Figures

SCALE FORMATION PREVENTOR AND/OR REMOVER

BACKGROUND OF THE INVENTION

1. Field of the Invention

The invention is related to the treatment of water and other fluids, and more particularly to the treatment of such water and other fluids for the purpose of preventing the formation of scale and removing scale that has already formed.

2. Discussion of the Problem

Water often contains dissolved minerals which are picked up when the water passes through underground rock formations and through surface streams and lakes. Water containing such minerals is said to be "hard", and the hardness can have several detrimental effects. First, it interferes with the lather-forming and cleaning capacity of soap, which leads to the uses of an excessive amount of soap in order to obtain the same degree of cleaning power. Second, and perhaps more importantly, the minerals can precipitate out of solution, especially under high temperature conditions, and form a scale in water handling equipment. Such scale can totally block pipes and other equipment and can otherwise change the operating characteristics or cause the complete failure of the equipment. The nature of the scale is often such that it is difficult to remove, and in many cases the surface which is contaminated is at a location which renders removal by chemical or mechanical means impossible.

A part of the hard water problem has been solved in domestic applications through the use of synthetic detergents for washing clothes. However, this does not solve the problem associated with personal washing or water heating appliances. Other solutions to the problem include the addition of reagents which form stable, soluble complexes with the cations in the hard water.

It is therefore an object of the present invention to provide an apparatus for preventing and/or removing scale which is simple and inexpensive but still effective.

It is a further object of the present invention to provide an apparatus for preventing and/or removing scale which does not require the addition of chemicals to or removal of chemicals from raw water.

It is another object of the present invention to provide an apparatus for preventing and/or removing scale which does not directly consume energy in its operation.

SUMMARY OF THE INVENTION

These and other objects of the present invention are accomplished by providing an elongated core having a longitudinal passage of reduced cross-sectional area formed therein to conduct the hardened water. The passage is shaped to provide closely-spaced parallel surfaces which have formed therein a multiplicity of microscopic randomly-located channels which form complementary protuberances having highly polished, flat tops.

BRIEF DESCRIPTION OF THE DRAWINGS

The invention may be more fully understood by reading the following description of a preferred embodiment of the invention in conjunction with the appended drawings wherein.

DETAILED DESCRIPTION OF A PREFERRED EMBODIMENT

Figure 1:
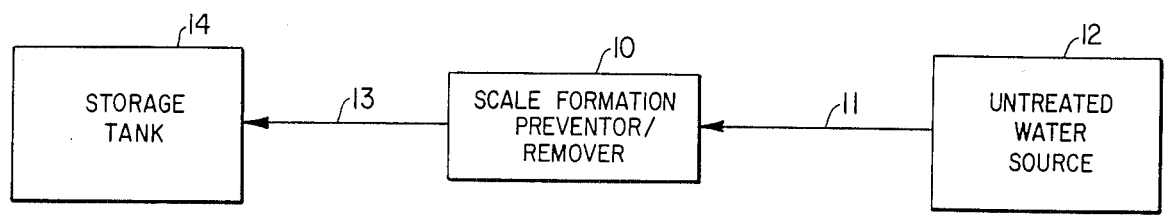
FIG. 1 is a block diagram of a water treatment system utilizing the present invention.

Referring to FIG. 1, a water treatment apparatus 10 is connected on one end by means of a pipe, or conduit, 11 to a source of untreated water 12, and on the other end by means of a pipe or conduit 13 to a storage tank 14, or other apparatus for using treated water.

Figure 2:
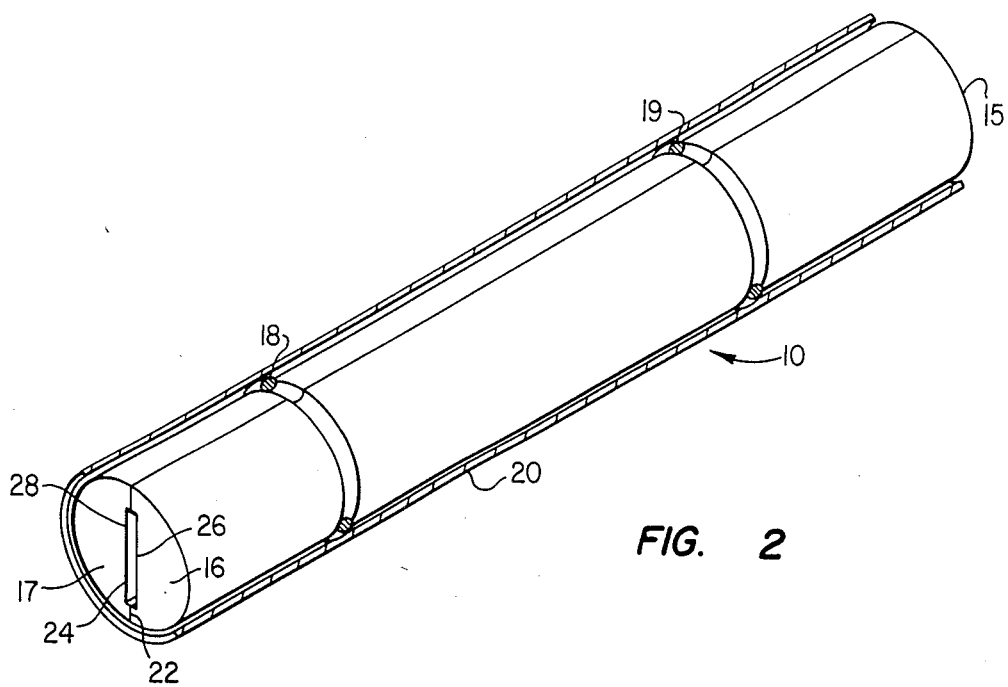
FIG. 2 is a partially cut-away, perspective view of the apparatus for removing and/or preventing scale in accordance with the present invention.
Figure 3:
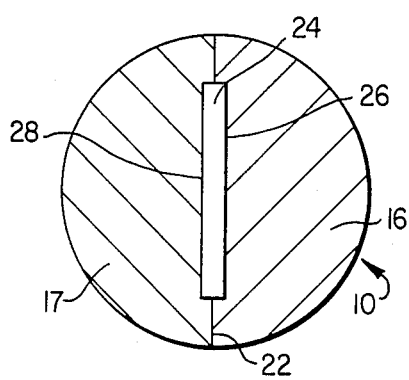
FIG. 3 is a cross-sectional view of the apparatus of FIG. 1.

Referring to FIGS. 2 and 3, the water treatment apparatus 10 comprises, in general, an elongate cylindrical core 15 of suitable corrosion-resistant alloy, similar to that used in musical instruments and food handling equipment, which is formed with complementary semi-cylindrical halves, or sections, 16 and 17. The preferred alloy for core 15 is ASTM copper alloy #976, which is a member of a class of alloys commonly called "nickel-silver" due to its coloration. The composition by weight of this alloy is: copper 65%, nickel 20.5%, zinc 6.5%, tin 4%, and lead 4%.

The "nickel-silver" family of alloys contain nickel in the range of 10–20% and zinc in the range of 5–45%. However, not all nickel-silver alloys react the same in water. The alloys containing higher than 10% zinc and lower than 15% nickel are eroded in water, especially if the water contains dissolved salt. They can be used as self-sacrificing anodes in a galvanic reaction to protect other metal parts from corrosion. The zinc element of the alloy is consistently mixed throughout the metal but retains separate grains within the grain structure of the alloy. The higher percentage mixtures of zinc have more and larger grains exposed for erosion. Since it is desirable that core 15 be long lasting and not contain a self-sacrificing element, a nickel-silver alloy containing a minimum of zinc is preferable. Further, as will be discussed hereinafter the grain structure is of critical importance to the invention, and consequently an alloy containing copper and nickel which combine into a single element that can be found in the grain structure, or copper-nickel lattice, of the alloy is desirable.

Sections 16 and 17 are secured together by means of a pair of suitable encircling O-rings 18 and 19 which fit into semi-cylindrical grooves (not shown) in peripheral surfaces of sections 16 and 17. O-rings 18 are preferably made of neoprene. Core 15 thus secured together is confined within the bore of a complementary cylindrical sleeve or housing 20. The complementary coextensive longitudinal interfaces 22 of the core halves 16 and 17 abut each other throughout their lengths and extend in diametric relationship to cylindrical core 15. A longitudinal passage 24 is coextensive with the rectangular interfaces 22 and may be formed by a pair of coacting complementary coextensive grooves, or channels, 26 and 28 provided therein. Grooves 26 and 28 are relatively wide but are shallow to provide a restricted cross-sectional area for passage 24.

The width of passage 24 should be small enough that sufficient surface contact with the water is produced, but it should not be so small that grains of sand, specks of rust and other foreign matter normally present in water may pass therethrough without clogging. This usually requires a minimum of 1/16 inch. It has been found that the preferable depth to width ratio for passage 24 is in the range of ⅛-3/16 inch to 1 inch. If the width of the passage exceeds ¼ inch, then it is preferable to use additional passages.

Figure 4:
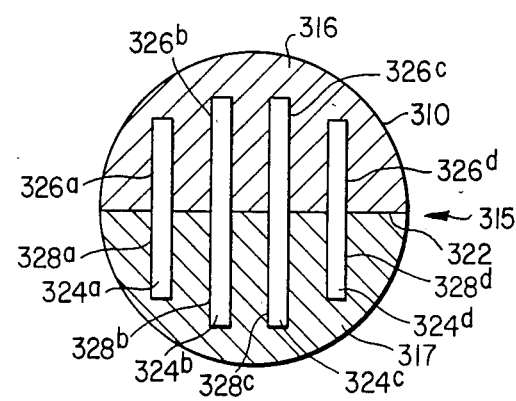
FIG. 4 is a cross-sectional view of a first alternative embodiment of the apparatus of FIG. 1.
Figure 5:
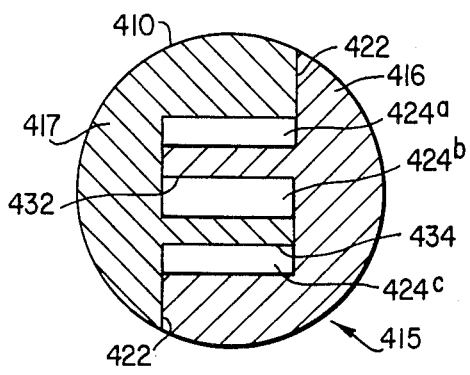
FIG. 5 is a cross-sectional view of a second alternative embodiment of the apparatus of FIG. 1.
Figure 6:
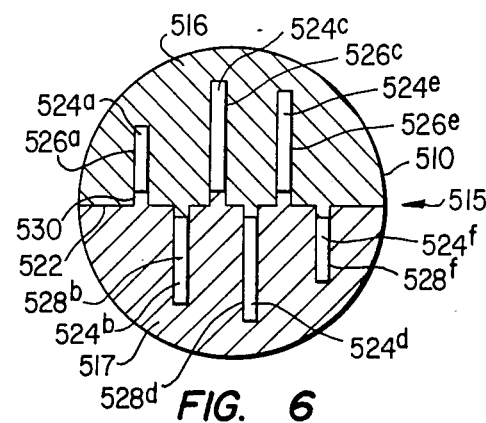
FIG. 6 is a cross-sectional view of a third alternative embodiment of the apparatus of FIG. 1.

Referring next to FIGS. 4 to 6, alternative forms of passage 24 are shown. In FIGS. 4 to 6 elements corresponding to elements in FIGS. 2 and 3 are given the same numbers in the tens and units positions and a hundreds digit corresponding to the figure number. Maximum surficial contact between the water and the interior of passage 24 may be provided by means of a plurality of parallel passages 324$a$–$d$ as shown in FIG. 4, wherein narrow deep aligned longitudinal channels or 326$a$–$d$ and 328$a$–$d$ are formed in the interfaces 322, perpendicular thereto, and vary in length in accordance with the cylindrical contour of the core 315. Alternatively, the multiple channels 424$a$–$c$ may be configured as shown in FIG. 5. Channels 424$a$–$c$ are formed by complementary fingers 432 and 434.

On the other hand, offset or staggered grooves 524$a$–$f$ may be provided as shown in FIG. 6 to form coextensive longitudinal passages 526$a$, 526$c$, and 526$e$ in section 516 and passages 528$b$, 528$d$, and 528$f$ in section 517, all of reduced depth. As shown at 530, longitudinal ribs project from the flat rectangular interface of each core half in alignment with the grooves or channels 524$a$–$f$ of the other core half for seating engagement within the outer ends of said channels or grooves.

Figure 7:
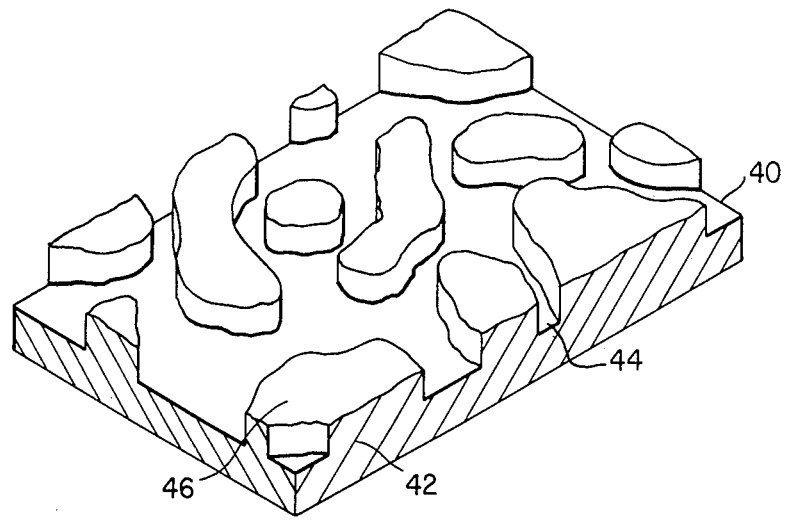
FIG. 7 is a greatly enlarged section of the polished and etched interior wall of the passage through the apparatus of FIG. 2.

Referring to FIG. 7, the surfaces of reduced passages 24, only a small, enlarged section 40 of which is shown in FIG. 7, and corresponding passages in FIGS. 3-5, are formed with a polished surface, which is then etched. The surface finish is accomplished by machining the surface and then sanding and buffing it until it attains an image reflective, or mirrored, smoothness. The etch finish, which is somewhat like matte, is obtained by dipping the core in a suitable etching liquid. The preferred etchant for the preferred alloy is ferric acid, and its formula, strength, and duration must be carefully monitored and controlled during manufacture. In the alternative, chromatic or other suitable acid may be used as an etchant.

In the etching process the polished surface of reduced passages 24 is swabbed with or agitated in an etchant which removes a very thin layer of smeared metal, and the process is continued until the desired amount of grain contrast is achieved. Various etchants, including ferric and chromatic acid, may be used for different alloys and for various purposes, although it has been found that ferric acid is preferable for the alloy described herein. The amount of grain contrast depends upon a tendency for more rapid chemical attack in some crystallographic directions than in others, so that adjacent grains of different orientation reflect the incident light in different directions.

The preferred ferric acid attacks the elements tin, lead, and zinc at a faster rate than the copper-nickel lattice grain structure, which as previously mentioned have a very high corrosion resistance. Thus, the copper-nickel grains are left as mesas above the etched plain. Other acids, such as chromatic acid, could be used, but it has been found that ferric acid performs more effectively.

Extreme care must be taken to insure that enough of the tin, lead, and zinc are removed to expose the copper-nickel grains. In addition, care must be taken that the copper-nickel is not eroded and that the pits in the tin, lead, and zinc are not excessive. The desired result is a copper-nickel grain structure that is parallel to the surface of the metal exposed and removal of a sufficient amount of the surrounding tin, lead, and zinc that calcite crystals will grow perpendicular to the surface and fluid flow. It is essential that the crystals are not supported by anything surrounding the copper-nickel grains so that the calcite will break off and be carried downstream by the fluid flow when they outgrow the copper-nickel site where they were spawned.

The combined polishing and etching leaves a multiplicity of mesas, such as indicated by the numeral 42, separated by etched channels, such as indicated by the numeral 44. The upper surfaces 46 of mesas 42 remain flat and polished. Although the entire core including its interfaces are etched due to such dipping, the only flow is through the passages formed by channels 24. The preferred ferric acid etchant attacks the tin, lead, and zinc at a faster rate than the copper-nickel lattice grain structure. Thus the copper grains are left as mesas which remain flat-topped plateaus above the etched plain.

Experience has shown that rough machined and sand casted surfaces both become coated over with crystals and cease being effective. Smooth etched surfaces, on the other hand, are long lasting because the scale crystals grow only perpendicularly to the surface. Thus, they do not intermesh at angles like those growing within sand pits of sand castings or rough machined surfaces. The bar stock from which the present invention is preferably made using continuous casting through a graphite mold or die.

When the calcite crystal growing on the copper-nickel grain structure on the smooth wall outgrows the size of the copper-nickel grain, the calcite crystal is detached and carried downstream by the water current. The precipitation of calcium carbonate as separate crystals is promoted by the crystals grown on the surface of the device by providing a nucleus for deposition of additional crystals precipitating from the supersaturated solution. Thus, additional crystalline calcite material grows on the already existing crystals instead of the less attractive metal of plumbing pipes, tea kettles, coffee makers, water heaters, cooling towers, and boilers.

Core 15 is manufactured by sawing a rod of the preferred alloy in half lengthwise and machining a wide, shallow passage, or groove, in the flat surface of each half. The machined surface of the shallow passage 24 is sanded and buffed to an image reflective smoothness. The surface of passage 24 is then etched to expose the crystalline grain structure. The two halves are then remated, and the circumference is machined until round and will fit into a pipe cylinder 20. When larger capacities are required, several parallel narrow slots are machined into the bar as illustrated in FIGS. 4 to 6.

Before core 15 is inserted into pipe 20, grooves are machined into the outer circumference to receive O-rings 18, whose purpose is to seal between core 15 and pipe 20 to ensure that all water flow is through passage 24. Core 15 may be held in position inside pipe 20 by means of internal retaining rings positioned in grooves (not shown) cut in the interior wall of pipe 20.

After manufacture the apparatus is installed in the incoming raw water line as far upstream of water usage as possible. This is important since it permits increased time for the reactions induced by the device to occur.

Operation of the Invention

In operation, untreated water containing scale forming minerals is moved by pumping, or the like, from source 12 through pipe 11 to water treatment apparatus 10 (FIG. 1). The treated water which emanates from water treatment apparatus 10 is carried by means of pipe 13 to a storage tank 14.

The water passing through water treatment apparatus 10 must flow through passage 24 (FIGS. 1 and 2), which has a relative small cross-sectional area. The reduced area of passage 24 causes the flow water therethrough to accelerate, and, in accordance with Bernoulli's Principle, the pressure of the water suddenly drops, causing carbon dioxide and calcium ions to be released from solution. The presence of carbon dioxide retards the precipitation of calcium carbonate and also forms carbonic acid which attacks scale already deposited in the system. The presence of carbon dioxide also acts to catalyze the dissolution of the scale, causing it to dissolve as much as 100 times as rapidly as in the absence of carbon dioxide.

The apparatus is most effective when the flow rate of water therethrough is near the maximum practical. This provides the maximum pressure change and promotes turbulent flow in passage 24. Care must be taken to match the capacity of the apparatus with the quantity of water desired to be treated, rather than just the size of the water line in which the apparatus is installed.

Each of the various sizes in which the device may be manufactured is rated as to its optimum flow rate in gallons per minute. When the supply line to an application is much larger than necessary to carry the water being consumed, then a smaller capacity device that can adequately treat the amount of water being consumed should be installed. As an example, a washing machine might be connected to a 2" water supply line; however, the water used may pass through valves, nozzles, and other restrictions so small that the volume of water consumed would pass through a ⅜ or ½ inch inlet water supply line. In this example the inlet supply line has a capacity of 80 gallons per minute, but the washing machine consumes only 5 gallons per minute.

If the device is too large for the application, then water only trickles through the water treatment device. In this situation the water will not be adequately treated, since there would not be enough velocity to create a significant pressure change. Thus, turbulent flow and the resulting chemical reaction described elsewhere herein would not occur.

Research and published tables show that the usual volume capacity of a 1 inch pipe line supplied by normal city pressure of 50 to 60 pounds per square inch produces a flow rate of approximately 20 gallons per minute. The water flowing at 20 gallons per minute through a one inch pipe is thus moving at approximately 7.5 feet per second.

Generally speaking, slow moving water or fluid moves smoothly along in the condition known as laminar flow. The fluid along the pipe wall (boundary layer) hardly moves at all, and the fluid movement is mostly in the center of the pipe. At a faster flow rate the liquid eddies, swirls, and tumbles along in a turbulent flow. This turbulence is beneficial to the device of the present invention since it permits greater contact between the water and the etched surface and assures more thorough mixing as the fluid flows downstream from the device. According to well-known principles of fluid flow, turbulent flow occurs at a Reynolds Number of 2000 and greater. The Reynolds Number is a function of fluid velocity, pipe diameter, fluid density, and fluid viscosity.

Turbulence starts at a much lower rate of flow than might be expected. For water at 60 degrees Fahrenheit passing through a one inch pipe reaches the R.#2000 at only 0.3 feet per second, which corresponds to only 0.8 gallons per minute. The same pipe is capable of a flow rate of 20 gallons per minute at a pressure of 60 pounds per square inch. It may thus be seen that the flow through a pipe will be turbulent usually if the flow is of any nominal rate of water consumption.

According to basic principles of fluid flow, when the velocity of the fluid doubles when passing through a flow restriction, the pressure of the fluid is reduced by one-half.

The device of the present invention when installed further assures turbulent flow. This occurs because the device constricts the cross-sectional area of the pipe about 80 percent for a short distance without affecting the volume of flow. The flow remains essentially constant because the velocity increase in the flow constriction compensates for the pressure drop.

Tests have shown that only approximately one square inch of etched surface in the present device is needed to treat each gallon per minute of flow. Thus, a pipe line of one inch capable of carrying 20 gallons per minute at 60 pounds per square inch need 20 square inches of etched surface for treatment. Thus, in an embodiment of the present device having a water passage 24 (FIG. 1) one inch wide and ⅛ inch deep, the treatment core 15 would need to be only 10 inches long. The following table illustrates the core sizes for several pipe sizes and flow rates:

| Pipe Dia. (in.) | Capacity (GPM @ 60 psi) | Etched Area (sq. in.) | Passage Size (in.) | Length (in.) |
| --- | --- | --- | --- | --- |
| ½ | 5 | 5 | 1/16 × ½ | 5 |
| 1 | 20 | 20 | ⅛ × 1 | 10 |
| 1½ | 45 | 45 | 3/16 × 1½ | 15 |

The relatively small cross-sectional area of passage 24 and the polishing and etching of the inner surface thereof also maximizes the contact between the molecules dissolved in the water with the alloy comprising the core 15. This causes calcite crystals to begin to form on mesas 42 on the inner surface of core 15 inside passage 24. When these crystals become too large to cling to the sites provided by mesas 44 on the etched surfaces of passage 24, they break off and are swept away by the current.

Etching exposes the crystalline grain structure of the continuously cast alloy. This inhibits laminar flow and increases the turbulence along such surfaces, thereby increasing the amount of surface contact. The hard water passing through the device of the present invention accelerates to a velocity that exceeds Reynolds Number 2000, which causes turbulent rather than laminar flow. Furthermore, this etching of a smooth flat surface causes its performance to be long lasting since the crystals grow only perpendicular to the surface and the flowing water. Thus, crystals break off and do not coat over the apparatus of the present invention by intermeshing at random angles like those growing over the surface of sand cast devices.

Theory of the Invention

The present invention initiates a chemical reaction within the elements of hard water which utilizes several identifiable scientific phenomena.

Hard water containing calcium bicarbonate is forced through the device with a sudden loss of pressure. The fluid flow is restricted, which increases the internal head pressure. When the flow passes through the narrow area the velocity of the flow accelerates with a concomitant pressure drop in accordance with Bernoulli's Principle.

The sudden reduction of pressure causes carbon dioxide to come out of the solution of the calcium bicarbonate which is always present in hard water. In addition, the calcium ions are released in accordance with the following equation:

$$Ca + 2(HCO_3) = Ca + H_2O + O + 2(CO_2).$$

During the passage through the narrow area the calcium ions are exposed to the crystalline grain structure of the cast alloy. The alloy is of such a composition that the copper, which crystallizes in a face-centered cubic structure, and the nickel, which crystallizes into a cubic closely packed structure, are homogenized into a face-centered structure.

The calcium ions also fortunately happen to crystallize in the face-centered cubic structure. The calcium ions $Ca++$ are attracted to the copper-nickel grain structure of the cast alloy device. These ions begin to crystallize only on the copper nickel grains as tiny deposits approximately one millionth inch in length in their unique shape, maintaining their width to length proportion and shape as they grow. When they get too large to remain attached, they are carried downstream by the current and thus become nuclei for the growth of calcite crystals, since they are more attractive sites than the metal pipes and equipment.

These calcite crystals float along in suspension not dissolved into solution. Tests show that treated supersaturated calcium bicarbonate or dolomite remains milky four to five times longer than a control batch not passing through the apparatus of the present invention. Such crystals can be removed from boilers, for example, by the daily blow-down. They are of a sufficiently small size, however, that they will pass through coffee makers, soft drink dispensers, dish and clothes washers, etc. When the crystals precipitate because of increased weight, the precipitate is a dense, hard, white concretionary calcium carbonate calcite. The precipitate may be rinsed or scooped from the bottom of cooling towers, etc., because it is not attached to the metal. Thus, since the dissolved minerals are freed from solution and are floating in suspension, they can be trapped by filters.

The carbon dioxide ($CO_2$) that was released from the solution combines with water ($H_2O$) to form carbonic acid ($H_2CO_3$), which is unstable and cannot be isolated. It attacks the scale on metal, and the freed calcium has affinity with the aforementioned calcite crystals floating in suspension.

When a solution of calcium bicarbonate is boiled, carbon dioxide is expelled, and the insoluble calcium carbonate is precipitated. Such reactions explain the formation of boiler scale when hard water is used in a tea kettle, service pipe, or boiler. Calcium carbonate is insoluble in pure water, but it dissolves in water containing carbon dioxide, being transformed into the soluble calcium bicarbonate $Ca(HCO_3)_2$, which is soluble in water containing carbonic acid. One liter of water normally dissolves 13 mg. of calcite; but in the presence of carbon dioxide, it dissolves 100 times as much.

Hard water contains such salts as calcium and magnesium bicarbonate or sulfate, which in addition to forming a deposit as boiler scale when the water is boiled, form a precipitate with soap and prevent the soap from functioning well as a dirt remover. Soap in water treated by the device of the present invention is not tied up as in hard water. Thus, less soap and detergents are needed for bathing and laundering. The savings in the expense of detergents soon offsets the initial expense of the device. In addition, the amount of water spots on dishes, etc., is greatly reduced.

Thusfar, chemical reactions of calcium carbonate have been described, but parallel or similar reactions occur with magnesium carbonate, dolomite, calcium sulfate, and magnesium sulfate.

In summary, there are three scientific phenomena related to the precipitation of calcium carbonate involved with the treatment of water in accordance with the present invention:

1. Water which normally should deposit calcium carbonate as a result of moderate heating or chemical treatment has a strong tendency to remain supersaturated.

2. Precipitation of calcium carbonate from such a supersaturated water may be prevented or greatly retarded under some conditions by very small amounts of a number of substances.

3. Precipitation of calcium carbonate as separate crystals may be promoted by the addition of some substances which provide nuclei for crystals to start to grow from the supersaturated solution. Welder, B. Q., and Partridge, Everett P., "Practical Performance of Water-Conditioning Gadgets", *Industrial and Engineering Chemistry*, Vol. 16, No. 5, p. 959 (May, 1954).

These phenomena provide several important advantages relative to the present invention. First, the tendency of water containing calcium carbonate to remain supersaturated is fortunate because otherwise pipes carrying hard water would fill with scale faster than they do.

Second, the increase in carbon dioxide effected by the present invention in the water solution retards the precipitation of calcium carbonate. A liter of water normally dissolves 13 mg. of calcite; but in the presence of carbon dioxide, it dissolves 100 times as much. Thus, not only does carbon dioxide retard the precipitation of calcium carbonate but it also promotes the dissolution of previously formed calcite scale.

Third, the calcite crystals whose growth is started on the carbon nickel grain structure of core 15 provide nuclei on which crystals can grow as they come out of the supersaturated solution. As these perfectly formed nuclei or crystals float or flow along downstream from the present device, they provide attractive sites for the calcium elements to deposit themselves upon as they also come out of solution.

While particular embodiments of the present invention have been shown and described, it is obvious that minor changes and modifications may be made therein without departing from the true scope and spirit of the invention. It is the intention in the appended claims to cover all such changes and modifications.

What is claimed is:

1. Apparatus for treating water to remove hardening minerals, comprising an elongated core having a longitudinal passage of reduced cross-sectional area formed therein having closely-spaced parallel surfaces, said surfaces having formed therein a multiplicity of microscopic randomly-located channels forming complementary protuberances having highly polished, flat tops, said core being constructed to receive water into said passage on one end thereof, to accelerate the flow of water through the channels to a Reynolds Number exceeding 2000, and to discharge water from said passage on the other end thereof, said core being comprised of a nickel-silver alloy containing less than 10 percent zinc and greater than 15 percent nickel, said parallel surfaces in said core being prepared by polishing followed by etching to form a copper nickel grain structure that is parallel to said surfaces and capable of causing crystals of said hardening minerals to grow only perpendicular to said surfaces and said flow of water.

2. Apparatus as described in claim 1 wherein said alloy is comprised of copper 65 percent, nickel 20.5 percent, zinc 6.5 percent, tin 4 percent, and lead 4 percent, by weight.

3. Apparatus as described in claim 2 wherein said etching is performed with an acid chosen from the group comprising ferric acid and chromatic acid.

4. Apparatus as described in claim 2 wherein said etching is performed with ferric acid.

5. Apparatus as described in claim 1 wherein said core has a multiplicity of additional longitudinal passages of reduced cross-sectional area formed therein having closely-spaced parallel surfaces, said surfaces having formed therein a multiplicity of microscopic randomly-located channels forming complementary protuberances having highly polished, flat tops.

6. Apparatus as described in claim 5 wherein a first portion of said passages are formed in the first cross-sectional half of said core and a second portion of said passages are formed in the second cross-sectional half of said core and said first and second portions of said passages are offset from each other.

7. Apparatus as described in claim 1 wherein said passage in said core is formed in a serpentine cross-sectional pattern.

8. Apparatus for treating water to remove hardening minerals, comprising a first semi-cylindrical core section having a shallow channel formed therein; a second semi-cylindrical core section having a shallow groove formed therein positioned to coact with the channel in the first core section to form a longitudinal passage having closely spaces parallel surfaces when said said first and second core sections are brought into abutment, said surfaces having formed therein a multiplicity of microscopic randomly-located channels forming complementary protuberances having highly polished, flat tops; a cylindrical sleeve surrounding said first and second core sections; and means for sealing between said first and second core sections and said sleeve, said core sections being constructed to receive water into said passage on one end thereof, to accelerate the flow of water through the channels to a Reynolds Number exceeding 2000, and to discharge water from said passage on the other end thereof, said core sections being comprised of a nickel-silver alloy containing less than 10 percent zinc and greater than 15 percent nickel, said parallel surfaces in said core section being prepared by polishing followed by etching to form a copper nickel grain structure that is parallel to said surfaces and capable of causing crystals of said hardening minerals to grow only perpendicular to said surfaces and said flow of water.

9. Apparatus as described in claim 8 wherein said alloy is comprised of copper 65 percent, nickel 20.5 percent, zinc 6.5 percent, tin 4 percent, and lead 4 percent, by weight.

10. Apparatus as described in claim 9 wherein said etching is performed with an acid chosen from the group comprising ferric acid and chromatic acid.

11. Apparatus as described in claim 9 wherein said etching is performed with ferric acid.

12. Apparatus as described in claim 8 wherein said first and second core sections have a multiplicity of additional longitudinal passages of reduced cross-sectional area formed therein having closely-spaced parallel surfaces, said surfaces having formed therein a multiplicity of microscopic randomly-located channels forming complementary protuberances having highly polished, flat tops.

13. Apparatus as described in claim 12 wherein a first portion of said passages are formed in the first cross-sectional half of said core and a second portion of said passages are formed in the second cross-sectional half of said core and said first and second portions of said passages are offset from each other.

14. Method of removing hardening minerals from water comprising the steps of: (a) providing an elongated core having a longitudinal passage of reduced cross-sectional area formed therein having closely-spaced parallel surfaces, said surfaces having formed therein a multiplicity of microscopic randomly-located channels forming complementary protuberances having highly polished, flat tops, said core being constructed to receive water into said passage on one end thereof, to accelerate the flow of water through the channels to a Reynolds Number exceeding 2000, and to discharge water from said passage on the other end thereof, said core being comprised of a nickel-silver alloy containing less than 10 percent zinc and greater than 15 percent nickel, said parallel surfaces in said core being prepared by polishing followed by etching to form copper nickel grain structure that is parallel to said surfaces and capable of causing crystals of said hardening minerals to grow only perpendicular to said surfaces and said flow of water; (b) polishing the parallel surfaces to a mirrored finish; (c) etching said polished parallel surfaces with an acid chosen from the group comprising ferric acid and chromatic acid; and (d) passing water containing hardened minerals through said passage at a rate at which the Reynolds Number exceeds 2000 to remove said hardening minerals.

* * * * *